United States Patent
Rodrigues

(10) Patent No.: US 10,415,227 B2
(45) Date of Patent: Sep. 17, 2019

(54) DRAIN VALVE ASSEMBLY

(71) Applicant: IPS Corporation, Collierville, TN (US)

(72) Inventor: Julio Filipe Rodrigues, Easton, PA (US)

(73) Assignee: IPS CORPORATION, Collierville, TN (US)

( * ) Notice: Subject to any disclaimer, the term of this patent is extended or adjusted under 35 U.S.C. 154(b) by 193 days.

(21) Appl. No.: 15/606,459

(22) Filed: May 26, 2017

(65) Prior Publication Data

US 2018/0340324 A1 Nov. 29, 2018

(51) Int. Cl.
*E03F 5/04* (2006.01)
*F16K 15/14* (2006.01)
*F16K 27/02* (2006.01)

(52) U.S. Cl.
CPC .......... *E03F 5/0407* (2013.01); *F16K 15/148* (2013.01); *F16K 27/0209* (2013.01); *E03F 2005/0417* (2013.01)

(58) Field of Classification Search
CPC ......... Y10T 137/6086; Y10T 137/7859; Y10T 137/7882; Y10T 137/7888; Y10T 137/789; F16K 15/148; F16K 27/0209; F16K 15/14; E03F 5/0407; E03F 2005/0417
See application file for complete search history.

(56) References Cited

U.S. PATENT DOCUMENTS

| | | |
|---|---|---|
| 803,979 A | 11/1905 | Bonnell |
| 2,912,999 A | 11/1959 | Kersh |
| 3,173,442 A | 3/1965 | McKillip |
| 3,354,903 A | 11/1967 | Caruso |
| 3,397,714 A | 8/1968 | Liljendahl |
| 3,497,395 A * | 2/1970 | Nuri .................... F16K 17/0446 137/860 |
| 3,707,986 A | 1/1973 | Breen |
| 3,714,733 A | 2/1973 | Madonna |

(Continued)

FOREIGN PATENT DOCUMENTS

| | | |
|---|---|---|
| KR | 10-1634204 | 6/2016 |
| WO | 02/103233 | 12/2002 |

OTHER PUBLICATIONS

International Search Report dated Sep. 19, 2018 in corresponding International application No. PCT/IB2018/053758 filed May 25, 2018.

*Primary Examiner* — Jessica Cahill
(74) *Attorney, Agent, or Firm* — Womble Bond Dickinson (US) LLP

(57) ABSTRACT

The present invention provides valve assembly for use in a floor drain. In various embodiments, the valve assembly comprises a substantially cylindrical seal frame, the seal frame defining a seal frame wall and at least one support wall extending in the longitudinal direction of the seal frame, a flexible sealing member located proximate a distal end of the seal frame, and an attachment tab configured to secure the flexible sealing member to the seal frame, wherein the seal frame and the support wall are further configured to create a resting deflection of the flexible sealing member, such that fluid may flow through the valve assembly in one direction, and the flow of gasses through the valve assembly is prevented in the opposite direction.

20 Claims, 9 Drawing Sheets

(56) References Cited

U.S. PATENT DOCUMENTS

| | | | |
|---|---|---|---|
| 4,185,655 A * | 1/1980 | Wilkes | F16K 15/06 |
| | | | 137/315.33 |
| 4,190,910 A | 3/1980 | Teglund et al. | |
| 4,610,246 A | 9/1986 | Delphia | |
| 5,601,112 A | 2/1997 | Sekiya et al. | |
| 6,202,749 B1 | 3/2001 | Adams et al. | |
| 6,273,124 B1 | 8/2001 | Huber et al. | |
| 6,795,987 B2 | 9/2004 | Cornwall | |
| 7,240,378 B2 | 7/2007 | Long et al. | |
| 7,891,027 B2 | 2/2011 | Mooney | |
| 7,900,288 B2 * | 3/2011 | Fima | C02F 1/325 |
| | | | 4/287 |
| 9,010,363 B2 | 4/2015 | Huber | |
| 9,027,172 B2 * | 5/2015 | Fima | E03D 13/007 |
| | | | 4/287 |
| 9,038,660 B2 | 5/2015 | Kirk | |
| 9,416,986 B2 | 8/2016 | Huber | |
| 2005/0155304 A1 | 7/2005 | Hung | |
| 2005/0257315 A1 | 11/2005 | Hung | |
| 2010/0018593 A1 | 1/2010 | Farruggia | |
| 2012/0152388 A1 | 6/2012 | Stanaland | |
| 2014/0053923 A1 | 2/2014 | Martinelli et al. | |
| 2015/0300511 A1 * | 10/2015 | Fima | F16K 15/148 |
| | | | 137/512 |
| 2016/0305559 A1 | 10/2016 | Cho | |
| 2017/0121953 A1 | 5/2017 | Benesh | |

* cited by examiner

DRAIN VALVE ASSEMBLY

BACKGROUND

In residential and commercial building construction it is often necessary to drain fluids into a drain pipe, such as, for example, water and/or other liquid mixtures into a vertical drain pipe. In many instances, this involves draining these fluids through a floor drain and into a drain pipe that is connected to a waste drain system, such as for example, a private or public sewage system. While it is desirable to allow fluid to flow through the drain in the effluent direction, it is also desirable to prevent gasses, which may exist in the drain pipe and/or drainage system, from flowing back through the drain and into the interior of the residential or commercial building.

Often, this problem is addressed using the shape of the drain pipe directly under the drain, such as, for example, a u-shaped, s-shaped, or j-shaped bend in the drain pipe. In many instances, however, this solution is ineffective or less effective, and in some situations, the configuration of the residential or commercial building does not allow for such a solution.

BRIEF SUMMARY OF VARIOUS EMBODIMENTS

In various embodiments the present invention provides a valve assembly for use in a floor drain. In one embodiment, the valve assembly comprises a substantially cylindrical seal frame, the seal frame defining a seal frame wall and at least one support wall extending in the longitudinal direction of the seal frame, a flexible sealing member located proximate a distal end of the seal frame, and an attachment tab configured to secure the flexible sealing member to the seal frame. The seal frame and the support wall are further configured to create a resting deflection of the flexible sealing member, such that fluid may flow through the valve assembly in one direction, and the flow of gasses through the valve assembly is prevented in the opposite direction. In some embodiments, the support wall is on a diametral plane proximate the center of the seal frame. In some embodiments, the support wall only extends a portion of the longitudinal length of the seal frame. In some embodiments, the seal frame wall includes a stepped section located on an inner surface thereof configured to support an outer edge portion of the flexible sealing member. In some embodiments, the seal frame wall includes a plurality of sealing ribs located on at least a portion of an outer surface of the seal frame wall. In some embodiments, the plurality of sealing ribs extend more than half the longitudinal length of the seal frame wall. In some embodiments, the seal frame includes at least three sealing ribs.

Some embodiments further comprise a crossbar member, wherein the support wall includes the attachment tab extending downwardly from a distal end of the support wall. In some embodiments, the support wall includes as least two attachment tabs, and the crossbar member includes at least two receiving features, wherein the attachment tabs of the support wall and the receiving features of the crossbar member are configured to removably secure the flexible sealing member to the seal frame. In some embodiments, the support wall includes as least two attachment tabs, and the crossbar member includes at least two receiving features, wherein the attachment tabs of the support wall and the receiving features of the crossbar member are configured to permanently secure the flexible sealing member to the seal frame. In some embodiments, the flexible sealing member includes the attachment tab extending upwardly from the flexible sealing member. In some embodiments, the flexible sealing member includes at least two attachment tabs, and the support wall includes at least two receiving features, wherein the attachment tabs of the flexible sealing member and the receiving features of the support wall are configured to removably secure the flexible sealing member to the seal frame.

The present invention also provides a method of constructing a valve assembly for use in a floor drain. In various embodiments, the method comprises forming a substantially cylindrical seal frame, the seal frame defining a seal frame wall and at least one support wall extending in the longitudinal direction of the seal frame, locating a flexible sealing member proximate a distal end of the seal frame, and securing the flexible sealing member to the seal frame with an attachment tab. The seal frame and the support wall are further configured to create a resting deflection of the flexible sealing member, such that fluid may flow through the valve assembly in one direction, and the flow of gasses through the valve assembly is prevented in the opposite direction. In some embodiments, the support wall is on a diametral plane proximate the center of the seal frame. In some embodiments, the support wall only extends a portion of the longitudinal length of the seal frame. In some embodiments, the seal frame wall includes a stepped section located on an inner surface thereof configured to support an outer edge portion of the flexible sealing member. In some embodiments, the seal frame wall includes a plurality of sealing ribs located on at least a portion of an outer surface of the seal frame wall. In some embodiments, the plurality of sealing ribs extend more than half the longitudinal length of the seal frame wall. In some embodiments, the seal frame includes at least three sealing ribs.

Some embodiments further comprise providing a crossbar member, wherein the support wall includes the attachment tab extending downwardly from a distal end of the support wall. In some embodiments, the support wall includes at least two attachment tabs, and the crossbar member includes at least two receiving features, wherein the attachment tabs of the support wall and the receiving features of the crossbar member are configured to removably secure the flexible sealing member to the seal frame. In some embodiments, the support wall includes at least two attachment tabs, and the crossbar member includes at least two receiving features, wherein the attachment tabs of the support wall and the receiving features of the crossbar member are configured to permanently secure the flexible sealing member to the seal frame. In some embodiments, the flexible sealing member includes the attachment tab extending upwardly from the flexible sealing member. In some embodiments, the flexible sealing member includes at least two attachment tabs, and the support wall includes at least two receiving features, wherein the attachment tabs of the flexible sealing member and the receiving features of the support wall are configured to removably secure the flexible sealing member to the seal frame.

BRIEF DESCRIPTION OF THE DRAWINGS

Figure 1:
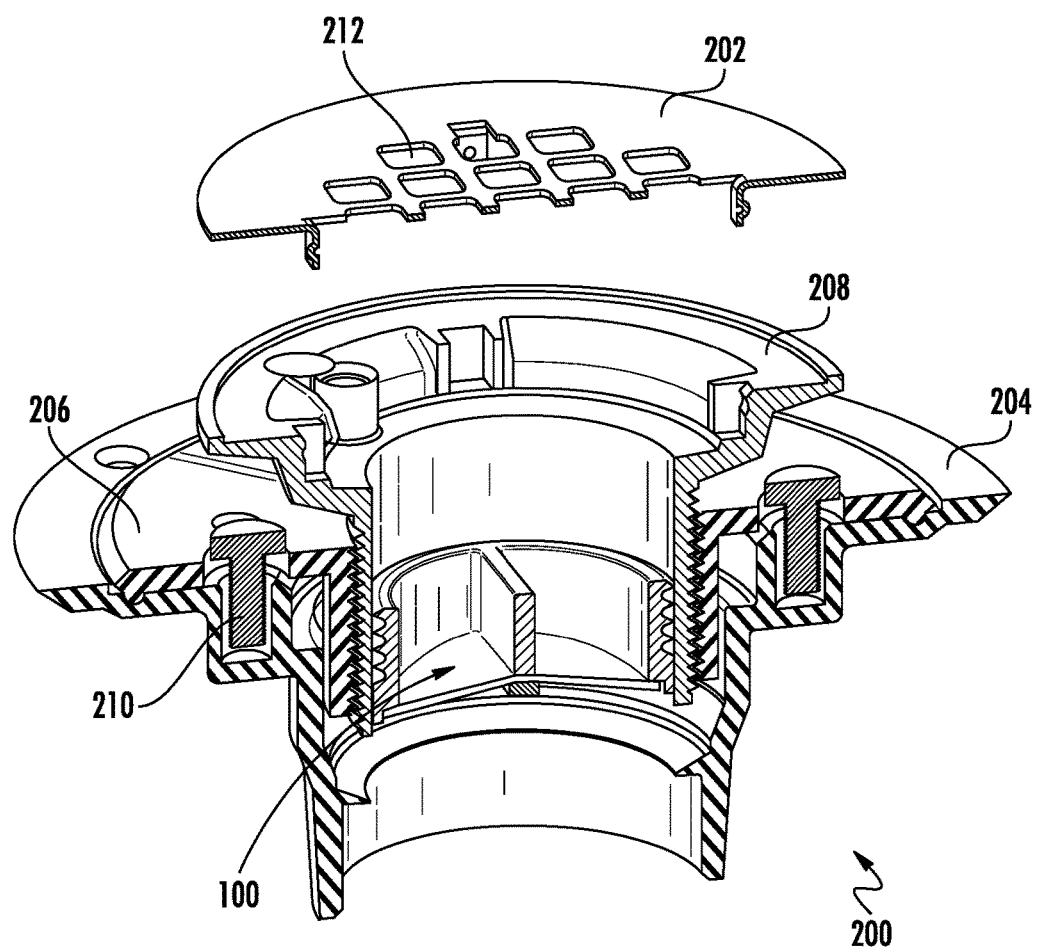
Figure 2:
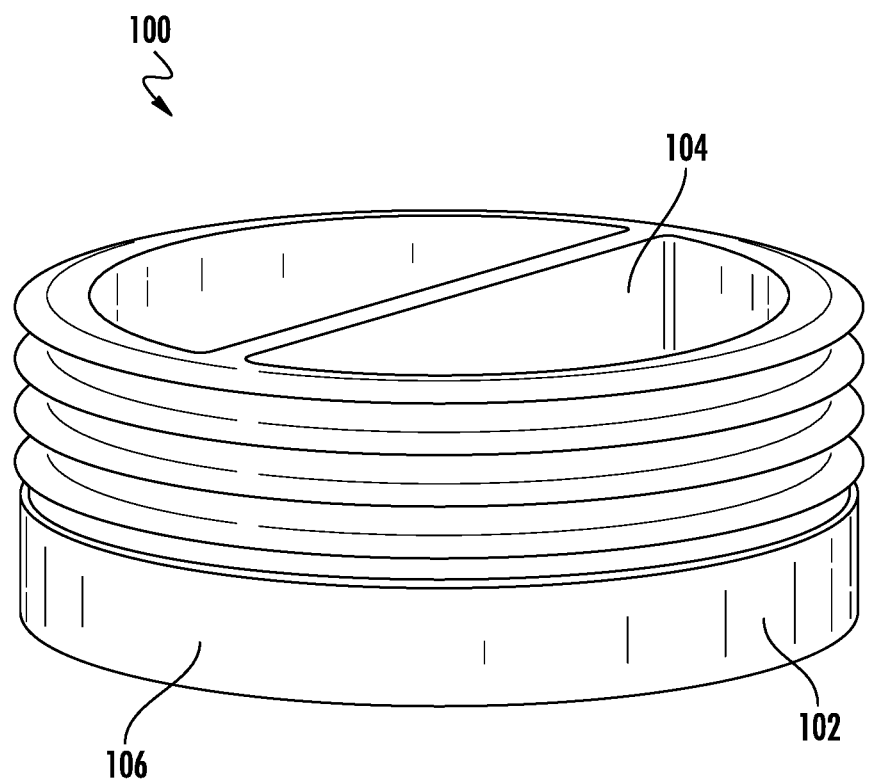
Figure 3:
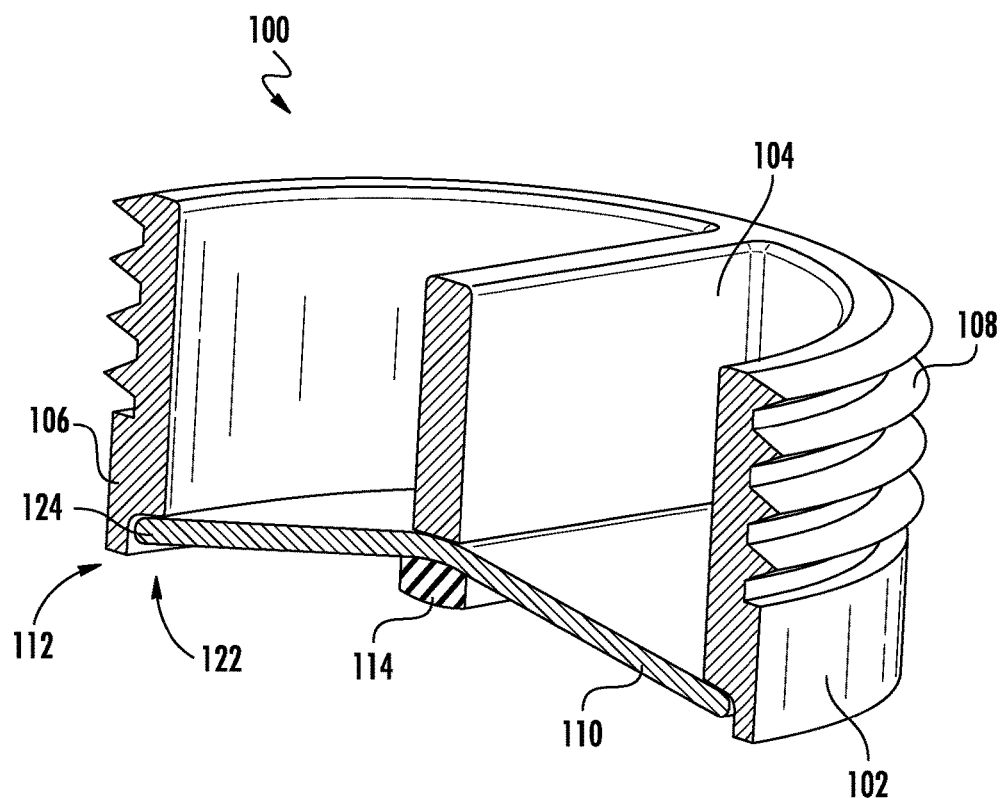
Figure 4:
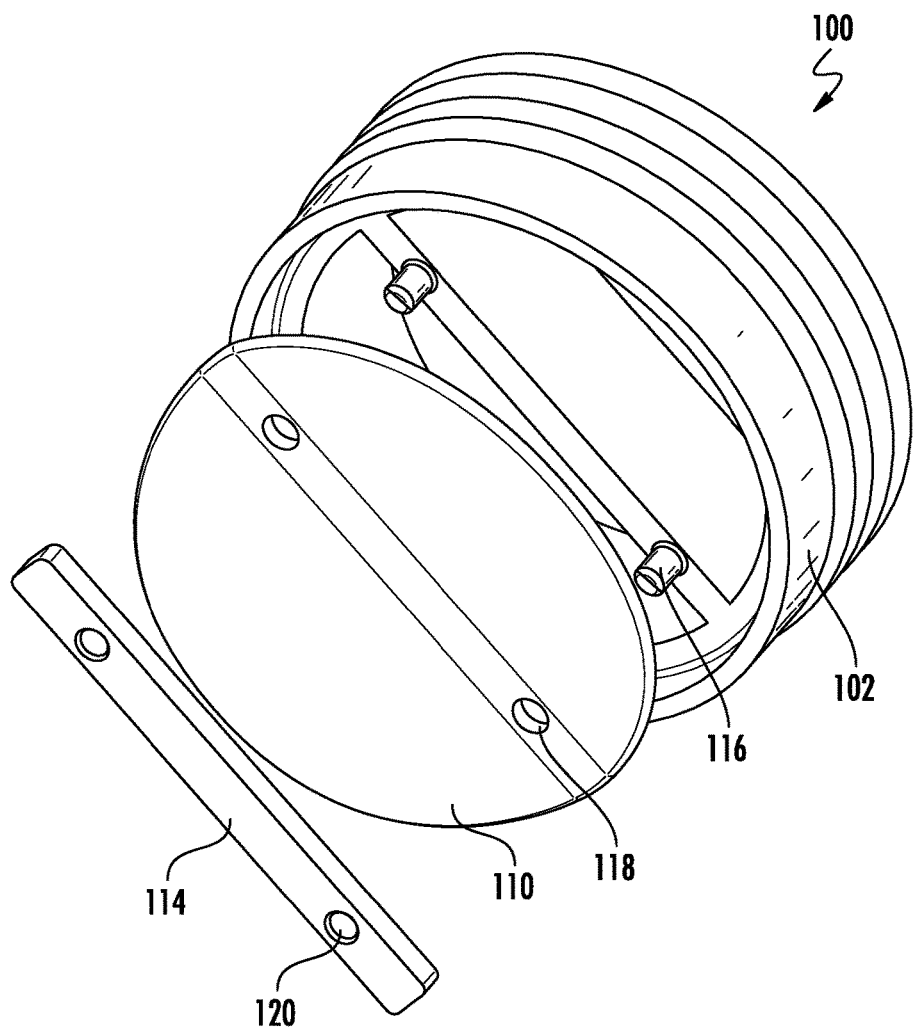
Figure 5:
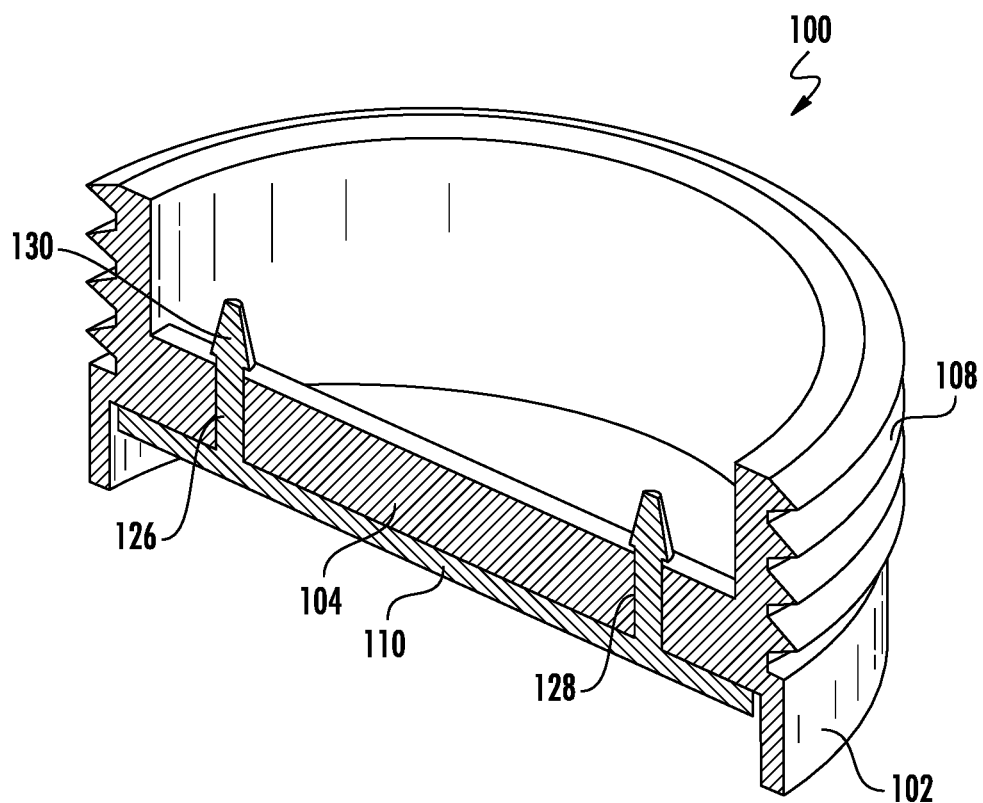
Figure 6:
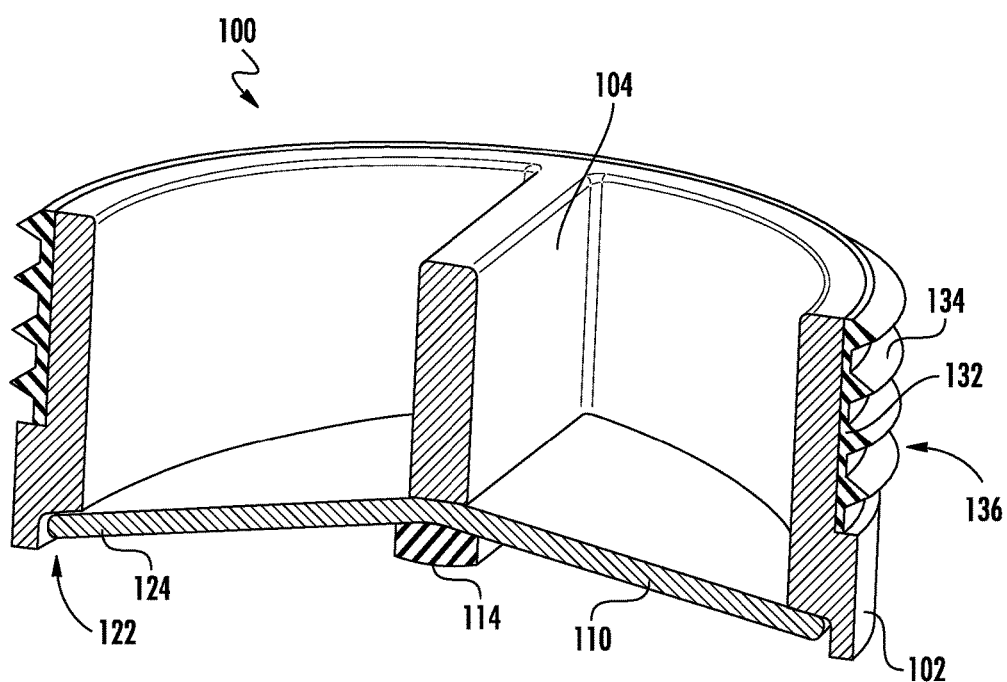
Figure 7:
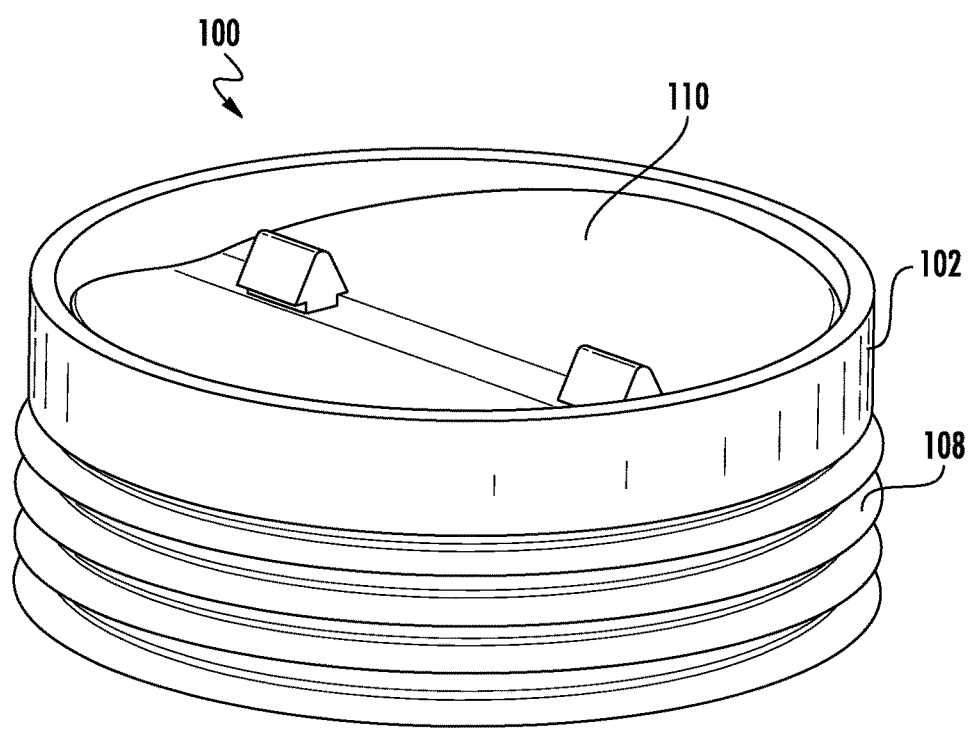
Figure 8:
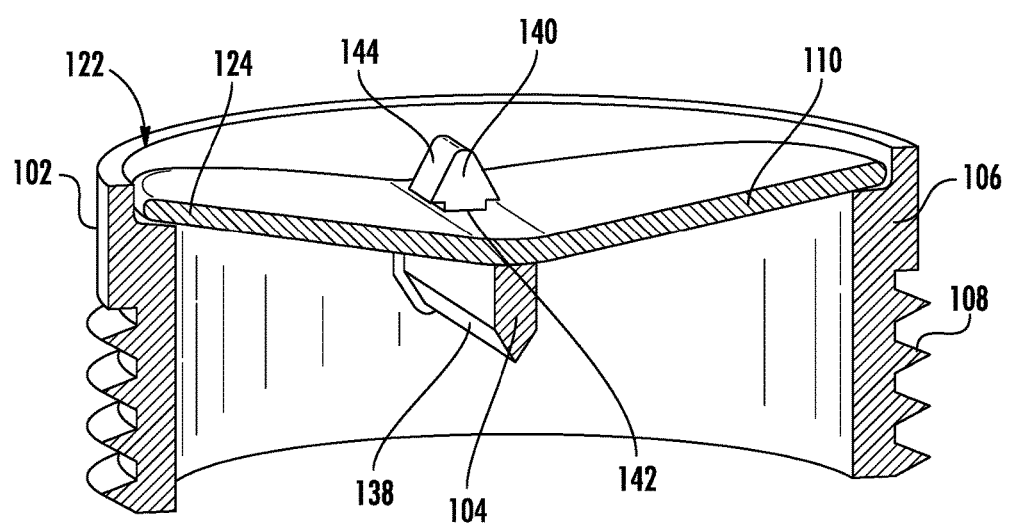
Figure 9:
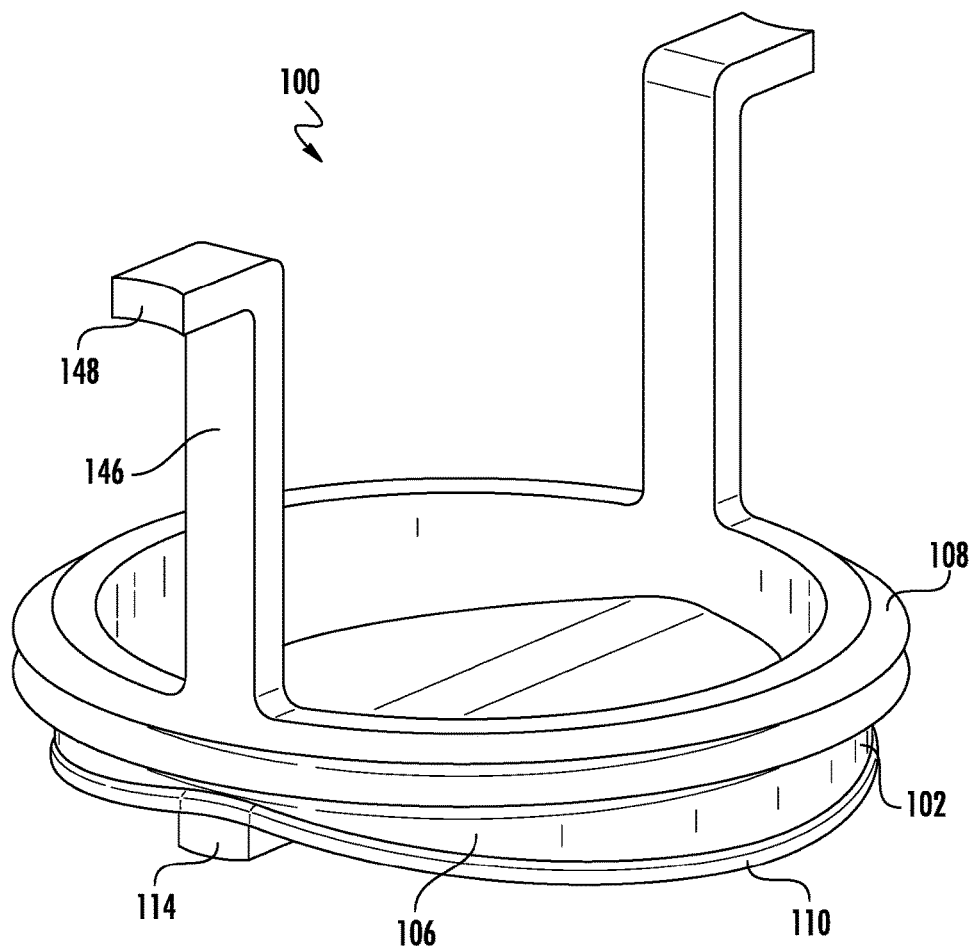

Having thus described the invention in general terms, reference will now be made to the accompanying drawings, which are not necessarily drawn to scale, and wherein:

FIG. 1 is a cross-section view of a valve assembly for use in a floor drain in accordance with an exemplary embodiment of the invention;

FIG. 2 is a perspective view of the valve assembly in accordance with an exemplary embodiment of the present invention;

FIG. 3 is a cross-section view of the valve assembly of FIG. 2 in accordance with an exemplary embodiment of the present invention;

FIG. 4 is an exploded view from underneath of the valve assembly of FIG. 2 in accordance with an exemplary embodiment of the present invention;

FIG. 5 is a cross-section view of a valve assembly in accordance with an exemplary embodiment of the present invention;

FIG. 6 is a cross-section view of a valve assembly in accordance with an exemplary embodiment of the present invention;

FIG. 7 is a perspective view (upside down) of a valve assembly in accordance with an exemplary embodiment of the present invention;

FIG. 8 is a cross-section view (upside down) of the valve assembly of FIG. 7 in accordance with an exemplary embodiment of the present invention; and FIG. 9 is a perspective view of a valve assembly in accordance with an exemplary embodiment of the present invention.

DETAILED DESCRIPTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a cross-section view of a valve assembly 100 for use in a floor drain in accordance with an exemplary embodiment of the invention. In particular, FIG. 1 shows a valve assembly 100 installed inside of a floor drain assembly 200. In various conditions, the floor drain assembly 200 may include a strainer 202, a body 204, a clamp ring 206, and a tailpiece 208. In the floor drain assembly shown in the figure, the clamp ring 206 is secured to the body 208 using a series of fasteners 210, such as, for example, bolts.

The body 204 of the floor drain assembly is configured to connect to a drain pipe (not shown) that connects to a waste drain system, such as, for example, a private or public sewage system. In the floor drain assembly shown in the figure, the tailpiece 208 is connected to the clamp ring 206 via threads that are located on the outer wall of the tailpiece 208 and corresponding threads located on the inner wall of the clamp ring 206. The strainer 202 includes a series of openings 212 that allow fluid to flow through the strainer 202, tailpiece 208, valve assembly 100, and body 204, and ultimately into the drain pipe. The series of openings 212 in the strainer 202 are also configured to stop larger pieces of debris or other objects from flowing into the drain. In various embodiments, certain components and/or features shown in FIG. 1 may be omitted or substituted with other components and/or features. For example, in some embodiments, the valve assembly 100 may be located in the clamp ring 206 or the body 204, or, in some embodiments, in the drain pipe itself.

As shown in more detail in FIGS. 2-4, the valve assembly 100 of the depicted embodiment includes a seal frame 102 and a support wall 104 that extends between opposite sides of a seal frame wall 106. In the depicted embodiment, the seal frame 102 is substantially cylindrical, however, in other embodiments the seal frame may have any shape that matches the general shape of the internal walls of the tailpiece or other plumping component to which it is to be installed. In the depicted embodiment, the seal frame 102 is constructed of a somewhat pliable material, such as, but not limited to, polyethylene or polypropylene resin. In various other embodiments, however, the seal frame may be constructed of a more rigid plastic resin. In the depicted embodiment, the support wall 104 is located on a diametral plane proximate the center of the seal frame 102, however, in other embodiments the support wall could be located on a diametral plane that is off-center. In the depicted embodiment (see, e.g., FIG. 3), the top of the support wall 104 is co-planar with the top of the seal frame wall 106, and the support wall 104 extends in the direction of the longitudinal length of the seal frame 102 for some portion of the full longitudinal length of the seal frame 102. In other embodiments, however, the support wall may extend the full length seal frame wall or any portion of the length of the seal frame wall. For example, in some embodiments, the support wall may extend more than half, but not the full longitudinal length of the seal frame.

In the depicted embodiment, the seal frame 102 also includes a pluralilty of sealing ribs 108 that extend circumferentially around the outside of the seal frame wall 106. In particular, in the depicted embodiment, the seal frame 102 includes four substantially evenly spaced sealing ribs 108 located proximate the top of the seal frame wall 106. In various other embodiments, however, the form and location of the sealing ribs may differ. For example, while in the depicted embodiment the plurality of sealing ribs 108 extend more than half the longitudinal length of the seal frame wall 106, but less than the distance the support wall 104 extends in the longitudinal direction (both of which are less than the full longitudinal length of the seal frame wall 106), in various other embodiments, the plurality of sealing ribs may extend the full length seal frame wall or any portion of the length of the seal frame wall. In addition, while the depicted embodiment shows four evenly spaced sealing ribs 108, in other embodiments there may be any number of sealing ribs, including only one.

Referring particularly to FIGS. 3 and 4, the valve assembly 100 of the depicted embodiment further includes a flexible sealing member 110 located proximate a distal end 112 of the seal frame 102. In the depicted embodiment, the flexible sealing member 110 is constructed of a soft material, such as, but not limited to, a silicone material, and has a thickness of approximately 0.07 inches. In various other embodiments, however, the flexible sealing member may be constructed of other suitable materials, such as, for example, other flexible and/or rubber-like materials, and the flexible sealing member may have other suitable thicknesses. In the depicted embodiment, the flexible sealing member 110 is secured to the seal frame 102 using a crossbar member 114 that attaches to the support wall 104 of the seal frame 102. In particular, in the depicted embodiment, two attachment tabs 116 are located on a lower end of the support wall 104, and the flexible sealing member 110 includes two openings 118 through which the two attachment tabs 116 pass. The two attachment tabs 116 are received by two corresponding openings 120 in the crossbar member 114, such that the flexible sealing member 110 is trapped against the lower end of the support wall 104. In the depicted embodiment, the crossbar member 114 is an elongate structure having a generally rectangular cross-section shape; however, in other embodiments the crossbar member may have any shape that allows fluid to flow through the valve assembly 100 in one direction, and that prevents the flow of gasses through the valve assembly 100 in the opposite direction. In some embodiments, the valve assembly may also allow water to evaporate through the structure. In the depicted embodiment, the width of the crossbar member 114 is slightly wider than the width of the support wall 104. In other embodiments, however, the width of the crossbar member may be less than or greater than that shown in the figure. In the depicted embodiment, the crossbar member 114 is constructed of a thermoplastic resin. In various other embodiments, however, the crossbar member may be constructed of any other suitable material, including a metal material.

Although in the depicted embodiment, the support wall 104 includes two attachment tabs 116, and the flexible sealing member 110 and the crossbar member 114 include two holes each (118 and 120, respectively), in various other embodiments the support wall may include any number of attachment tabs, and the flexible sealing member and the crossbar member may include any number and/or a corresponding number of holes. In the depicted embodiment, the attachment tabs 116 are heat-welded or press-fit after the flexible sealing member 110 and the crossbar member 114 have been attached such that the flexible sealing member 110 is "permanently" secured to the seal frame 102. That is, in such an embodiment, after the attachment tabs 116 have been heat-welded or press-fit, the crossbar member 114, and thus the flexible sealing member 110, are not easily removable from the seal frame 102. In other embodiments, however, the attachment tabs may be configured such that the crossbar member, and thus the flexible sealing member, are removably attached to seal frame. In some embodiments, this could be accomplished by including a snap feature or ring on the attachment tabs and/or the holes of the crossbar member.

In the depicted embodiment, the flexible sealing member 110 is configured such that, unencumbered, it exists in a flat orientation, and if deflected, it tends to try to return to the flat orientation. In the embodiment depicted in FIGS. 1-4, the valve assembly 100 is configured so as to create a resting deflection of the flexible sealing member 110 (most clearly shown in FIG. 3). In such a manner, the valve assembly 100 is configured such that the flexible sealing member 110 flexes about the crossbar member 114 when fluid is present above the flexible sealing member 110, thus allowing the fluid to flow through the valve assembly in one direction (i.e., down the drain pipe), and the flexible sealing member 110 returns to its resting position when fluid is not present above the flexible sealing member 110 in order to prevent the flow of gasses through the valve assembly in the opposite direction. In the depicted embodiment, the resting deflection of the sealing member 110 is created by the support wall 104 and an angled (and/or curved) shape of a stepped section 122 in the inner surface of the seal frame wall 106. In such a manner, the stepped section 122 of the seal frame wall 106 is configured to support an outer edge portion 124 of the flexible sealing member 110 in a resting position. In the depicted embodiment, the flexible sealing member 110 is deflected at an angle of approximately 10° in a resting state. In other embodiments, however, the flexible sealing member may have a different angle of deflection, depending on the specific needs of the application.

In the depicted embodiment, the outer shape of the flexible sealing member 110 matches the internal shape of the seal frame wall 106, and the flexible sealing member 110 has an outer diameter that is less than the outer diameter of the seal frame 102. In other embodiments, however, the flexible sealing member may have any shape such that the valve assembly is configured to allow fluid to flow through the valve assembly in one direction, and the flow of gasses in the opposite direction is prevented. As such, the overall shape of the flexible sealing member need not match the internal shape of the seal frame wall, and the diameter of the flexible sealing member may be equal to or larger than the outer diameter of the seal frame.

FIG. 5 is a cross-section view of a valve assembly 100 in accordance with another exemplary embodiment of the present invention. The valve assembly 100 in accordance with FIG. 5 is similar to the embodiment described above in that it includes a seal frame 102 having a plurality of sealing ribs 108, a support wall 104, and a flexible sealing member 110. However, in the depicted embodiment, the top of the support wall 104 is not co-planar with the top of the seal frame wall 106 and only extends a limited longitudinal length of the seal frame 102 (e.g., less than half the longitudinal length of the seal frame 102). In addition, the support wall 104 of the depicted embodiment does not include attachment tabs. Rather, the flexible sealing member 110 of the depicted embodiment includes two substantially cylindrical protrusions 126 extending upwardly from the flexible sealing member 110. In the depicted embodiment, the protrusions 126 are configured to extend through two corresponding holes 128 in the support wall 104, wherein each protrusion 126 includes a securing feature 130 on the end thereof. In the depicted embodiment, the securing features 130 are configured to secure the flexible sealing member 110 to the seal frame 102. In particular, each securing feature 130 of the depicted embodiment comprises a cone shape, that facilities inserting the protrusion 126 through the respective hole of the support wall 104, and a circumferential edge that traps the securing feature 130 against top of the support wall 104. Although the protrusions 126 and securing features 130 of the depicted embodiment have the shapes described above, in some embodiments the protrusions and securing features may have other shapes that allow the flexible sealing member to be secured to the seal frame via the support wall.

FIG. 6 is a cross-section view of a valve assembly 100 in accordance with another exemplary embodiment of the present invention. The valve assembly in accordance with FIG. 6 is similar to the embodiment described with respect to FIGS. 2-4, in that it includes a seal frame 102, a support wall 104, a flexible sealing member 110, and a crossbar member 114. However, in the depicted embodiment, the seal frame 102 does not include a plurality of sealing ribs. Rather, a separate sealing gasket 132 is attached around the top end of the seal frame 102, wherein the sealing gasket 132 includes a plurality of sealing ribs 134. In particular, in the depicted embodiment, the seal frame 102 includes a smaller diameter area 136 onto which the sealing gasket 132 is secured, such as, for example, by stretching the sealing gasket 132 over the smaller diameter area 136. In the depicted embodiment, the sealing gasket 132 is constructed of a soft material, such as, but not limited to, a silicone material. In various other embodiments, however, the sealing gasket may be constructed of any other suitable material, including other pliable and/or rubber-like materials. In other embodiments, the sealing gasket could be secured in other ways, such as, for example, by using an adhesive. In addition, although in the depicted embodiment the smaller diameter area 136 is located proximate the top end of the seal frame 102, in other embodiments, the smaller diameter area could be located anywhere along the longitudinal length of the seal frame, and need not begin at the top of the seal frame wall. Furthermore, some embodiments need not include a smaller diameter area at all. In such embodiments, for example, the sealing gasket could be secured to the outer diameter of the seal frame.

FIG. 7 is a perspective view (upside down) of a valve assembly 100 in accordance with another exemplary embodiment of the present invention. FIG. 8 is a cross-section view (upside down) of the valve assembly 100 of FIG. 7. The valve assembly 100 in accordance with FIGS. 7 and 8 is similar to the embodiment described with respect to FIGS. 2-4 in that it includes a seal frame 102 having a plurality of sealing ribs 108, a support wall 104, and a flexible sealing member 110. However, in the depicted embodiment, the top of the support wall 104 is not co-planar with the top of the seal frame wall 106 and only extends limited longitudinal length of the seal frame. In addition, the top of the support wall 104 includes an angled profile 138 so as to facilitate flow of fluid through the valve assembly 100. Furthermore, the depicted embodiment of the valve assembly 100 does not include a crossbar member. Rather, the support wall 104 includes two protrusions 140 that extend downwardly from the bottom of the support wall 104. In the depicted embodiment, the protrusions 140 are configured to extend through two corresponding holes 142 in the flexible sealing member 110. In the depicted embodiment, the protrusions 140 have a substantially rectangular lateral cross-section such that the corresponding holes 142 in the flexing sealing member 100 are also substantially rectangular in shape. In addition, each of the protrusions 140 includes a securing feature 144 on the end thereof. In the depicted embodiment, the securing features 144 are configured to secure the flexible sealing member 110 to the seal frame 102. In particular, each securing feature 144 of the depicted embodiment comprises an arrowhead shape, that facilities inserting the protrusion 140 through the respective hole 142 of the flexible sealing member 110, and a circumferential edge that traps the securing feature 144 against the bottom of the flexible sealing member 110. Although the protrusions 140 and securing features 144 of the depicted embodiment have the shapes described above, in some embodiments the protrusions and securing features may have other shapes that allow the flexible sealing member to be secured to the seal frame via the support wall. In the depicted embodiment, the flexible sealing member includes a resting angle of deflection due to the support wall 104 and the shape and/or angle of the stepped section 122 in the inner surface of the seal frame wall 106; however, in other embodiments, depending on the specific needs of the application, the flexible sealing member may not include, or may have a different, resting angle of deflection. In the depicted embodiment, the stepped section 122 supports an outer edge portion 124 of the flexible sealing member 110 in a resting position.

FIG. 9 is a perspective view of a valve assembly 100 in accordance with another exemplary embodiment of the present invention. The valve assembly 100 in accordance with FIG. 9 is similar to the embodiment described with respect to FIGS. 2-4 in that it includes a seal frame 102 having a plurality of sealing ribs 108, a flexible sealing member 110, and a crossbar member 114. However, in the depicted embodiment, the valve assembly 100 does not include a support wall. In addition, the valve assembly 100 of the depicted embodiment has a shorter longitudinal length. Furthermore, the valve assembly 100 of the depicted embodiment has a pair of elongate positioning legs 146 extending upwardly from opposite sides of the seal frame 102. In the depicted embodiment, each positioning leg 146 further includes a turned end 148 that is configured to facilitate positioning the valve assembly in a drain. For example, if installed in an environment similar to that shown in FIG. 1, the turned ends 148 of the positioning legs 146 are configured to locate on a surface of the tailpiece, and, in some embodiments, may be received by corresponding receiving features in the tailpiece.

In order to secure the crossbar member 114, and thus the flexible sealing member 110, to the seal frame 102, the seal frame wall 106 of the depicted embodiment includes two attachment tabs (not visible) that extend downwardly from the seal frame wall 106 below the positioning legs 146. As with the embodiment described with respect to FIGS. 2-4, the flexible sealing member 110 includes two openings (not visible) through which the two attachment tabs pass. The two attachment tabs are received by two corresponding openings (not visible) in the crossbar member 114, such that the flexible sealing member 110 is trapped against the lower end of the support wall 104. In the depicted embodiment, the attachment tabs are heat-welded or press-fit after the flexible sealing member 110 and the crossbar member 114 have been attached such that the flexible sealing member 110 is "permanently" secured to the seal frame. That is to say, in such an embodiment, after the attachment tabs have been heat-welded or press-fit, the crossbar member 114, and thus the flexible sealing member 110, are not easily removable from the seal frame 102. In other embodiments, however, the attachment tabs may be configured such that the crossbar member, and thus the flexible sealing member, are removably attached to seal frame. In various embodiments, this could be accomplished by including a snap feature or ring on the attachment tabs and/or the holes of the crossbar member.

In the embodiment depicted in FIG. 9, the valve assembly 100 is configured so as to create a resting deflection of the flexible sealing member 110. In the depicted embodiment, the resting deflection of the sealing member 110 is created by an angled and/or curved shape of the seal frame wall 106, above the flexible sealing member 110. As such, in the depicted embodiment, the outer diameter of the flexible sealing member 110 is larger than the outer diameter of the seal frame wall 106 directly above the flexible sealing member 110.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A valve assembly for use in a floor drain, said valve assembly comprising:
  a substantially cylindrical seal frame, the seal frame defining a seal frame wall and a support wall extending in the longitudinal direction of the seal frame;
  a flexible sealing member located proximate a distal end of the seal frame; and
  at least one attachment tab configured to secure the flexible sealing member to the seal frame,
  wherein the seal frame wall and the support wall are further configured to create a resting deflection of the flexible sealing member, such that fluid may flow through the valve assembly in one direction, and the flow of gasses through the valve assembly is prevented in the opposite direction, and further comprising an elongate crossbar member configured to attach to the at least one attachment tab and directly trap the flexible sealing member against the support wall.

2. The valve assembly of claim 1, wherein the support wall is on a diametral plane proximate the center of the seal frame.

3. The valve assembly of claim 1, wherein the support wall only extends a portion of the longitudinal length of the seal frame.

4. The valve assembly of claim 1, wherein the seal frame wall includes a stepped section located on an inner surface thereof configured to support an outer edge portion of the flexible sealing member.

5. The valve assembly of claim 1, wherein the seal frame wall includes a plurality of sealing ribs located on at least a portion of an outer surface of the seal frame wall.

6. The valve assembly of claim 5, wherein the plurality of sealing ribs extend more than half the longitudinal length of the seal frame wall.

7. The valve assembly of claim 5, wherein the seal frame wall includes at least three sealing ribs.

8. The valve assembly of claim 1, wherein the support wall includes the at least one attachment tab extending downwardly from a distal end of the support wall.

9. The valve assembly of claim 8, wherein the at least one attachment tab of the support wall comprises two attachment tabs, and the crossbar member includes two receiving features, and wherein the attachment tabs of the support wall and the receiving features of the crossbar member are configured to removably secure the flexible sealing member to the seal frame.

10. The valve assembly of claim 8, wherein the at least one attachment tab of the support wall comprises two attachment tabs, and the crossbar member includes two receiving features, and wherein the attachment tabs of the support wall and the receiving features of the crossbar member are configured to permanently secure the flexible sealing member to the seal frame.

11. A method of constructing a valve assembly for use in a floor drain, said method comprising:
forming a substantially cylindrical seal frame, the seal frame defining a seal frame wall and a support wall extending in the longitudinal direction of the seal frame;
locating a flexible sealing member proximate a distal end of the seal frame; and
securing the flexible sealing member to the seal frame with at least one attachment tab, wherein the seal frame wall and the support wall are further configured to create a resting deflection of the flexible sealing member, such that fluid may flow through the valve assembly in one direction, and the flow of gasses through the valve assembly is prevented in the opposite direction, and further providing an elongate crossbar member, and attaching the crossbar member to the at least one attachment tab to directly trap the flexible sealing member against the support wall.

12. The method of constructing a valve assembly of claim 11, wherein the support wall is on a diametral plane proximate the center of the seal frame.

13. The method of constructing a valve assembly of claim 11, wherein the support wall only extends a portion of the longitudinal length of the seal frame.

14. The method of constructing a valve assembly of claim 11, wherein the seal frame wall includes a stepped section located on an inner surface thereof configured to support an outer edge portion of the flexible sealing member.

15. The method of constructing a valve assembly of claim 11, wherein the seal frame wall includes a plurality of sealing ribs located on at least a portion of an outer surface of the seal frame wall.

16. The method of constructing a valve assembly of claim 15, wherein the plurality of sealing ribs extend more than half the longitudinal length of the seal frame wall.

17. The method of constructing a valve assembly of claim 15, wherein the seal frame wall includes at least three sealing ribs.

18. The method of constructing a valve assembly of claim 11, wherein the support wall includes the at least one attachment tab extending downwardly from a distal end of the support wall.

19. The method of constructing a valve assembly of claim 18, wherein the at least one attachment tab of the support wall comprises two attachment tabs, and wherein the crossbar member includes two receiving features, and wherein the attachment tabs of the support wall and the receiving features of the crossbar member are configured to removably secure the flexible sealing member to the seal frame.

20. The method of constructing a valve assembly of claim 18, wherein the at least one attachment tab of the support wall comprises two attachment tabs, and wherein the crossbar member includes two receiving features, and wherein the attachment tabs of the support wall and the receiving features of the crossbar member are configured to permanently secure the flexible sealing member to the seal frame.

* * * * *